March 5, 1946.   J. D. MORGAN ET AL   2,396,190
PURIFICATION OF SUBMARINE ATMOSPHERES
Filed Sept. 28, 1943
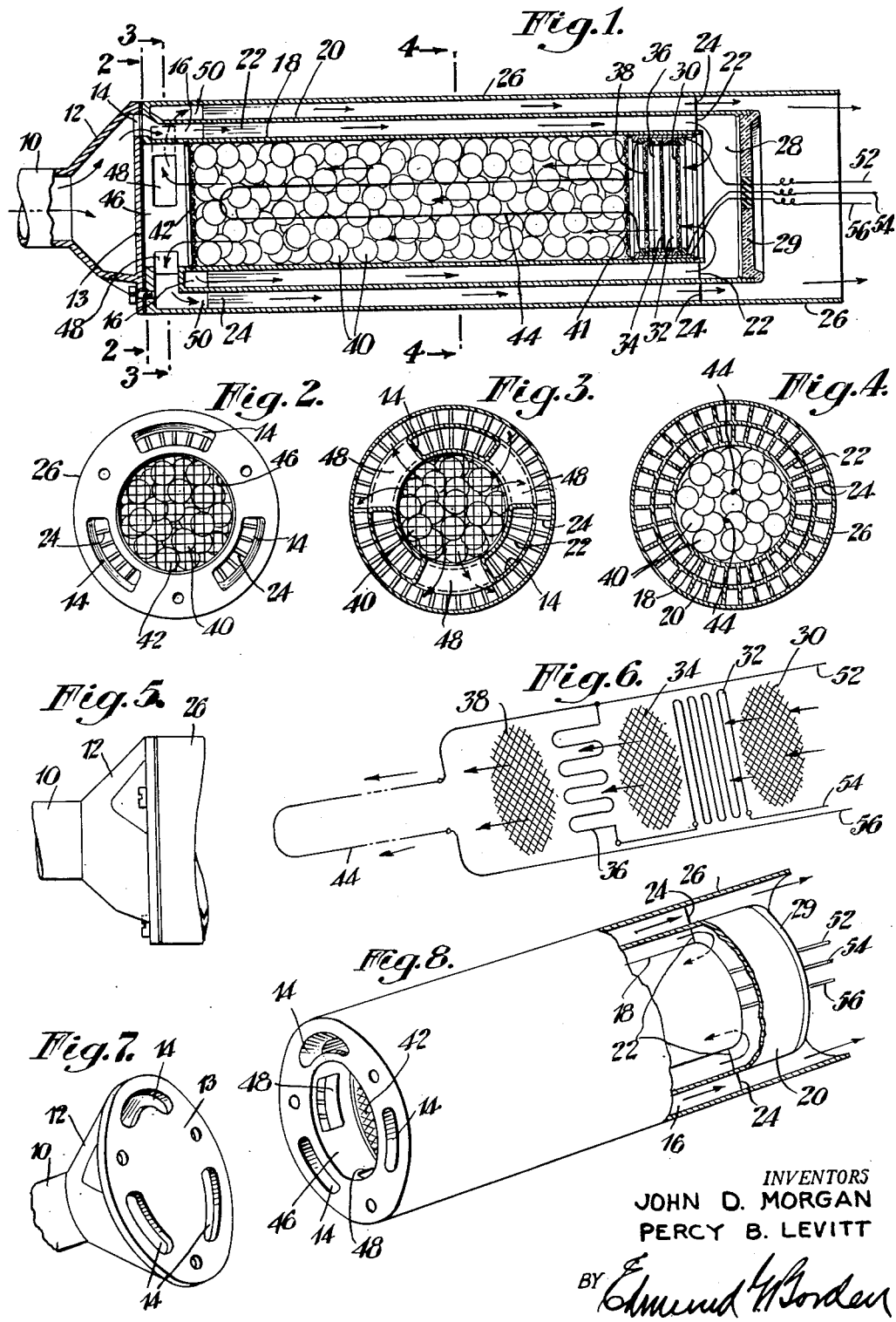
INVENTORS
JOHN D. MORGAN
PERCY B. LEVITT Patented Mar. 5, 1946

2,396,190

UNITED STATES PATENT OFFICE 2,396,190

PURIFICATION OF SUBMARINE ATMOSPHERES

John D. Morgan, South Orange, and Percy B. Levitt, Millburn, N. J., assignors to Cities Service Oil Company, New York, N. Y., a corporation of Pennsylvania Application September 28, 1943, Serial No. 504,088

5 Claims. (Cl. 23—4)

This invention relates to the purification of submarine atmospheres and more particularly to the elimination of the free hydrogen content of the air in submarines by a catalytic oxidation procedure.

One of the hazards of operating submarine boats, torpedoes or mines is the evolution of hydrogen from electric storage batteries. The atmosphere of a submarine may be ventilated when it is on the surface and the batteries are being charged by Diesel or other engines, but when the submarine must operate below the surface, the hydrogen produced by the batteries accumulates in the atmosphere, and may form a dangerously explosive mixture if allowed to accumulate to any appreciable percentage. The proportion of hydrogen in submarine, torpedo or mine atmospheres must be kept below about 2% in order to avoid the danger of an explosion. Submarines operated in tropical waters have an unusual hazard because of the high temperatures. Hydrogen evolution at 100° F. is at about twice the rate of that at 80° F.

In addition to the evolution of hydrogen, it has been found that stibine and possibly other metal hydrides are also evolved by storage batteries, and that stibine interferes with the effective elimination of free hydrogen because of the poisoning of the catalyst.

The primary object of the present invention is to provide an improved process for purifying submarine atmospheres, and more particularly to eliminate free hydrogen.

A further object of the invention is to provide a catalytic process by which the hydrogen content of enclosed atmospheres may be effectively eliminated.

A further object of the invention is to provide an improved process and apparatus which will be effective under adverse catalyst poisoning conditions for the elimination of free hydrogen from atmospheres such as in submarines.

According to the improvements of the present invention, the submarine atmosphere or air from which the free hydrogen is to be eliminated is passed through an apparatus in which the air is first heated to a temperature of about 350–450° F. for the decomposition of stibine which is evolved by electric storage batteries, after which the air containing free hydrogen is passed in intimate contact with an oxidation catalyst adapted to cause the oxidation of the hydrogen to form water. The catalyst is preferably maintained at a temperature of from 600° to 700° F., and the hot air discharged from the catalyst reaction zone is passed in heat exchange with air to be treated.

The apparatus used for carrying out the steps of the improved process comprises a novel arrangement of elements as will be seen from the description given hereinafter.

Other features, objects and advantages of the present invention will be apparent to those skilled in the art from the following more detailed description thereof taken in connection with the accompanying drawing in which:

Fig. 1 is a longitudinal sectional view of an apparatus constructed in accordance with the features of the present invention and adapted to carry out the improved process.

Fig. 2 is a cross-sectional view taken on the line 2—2 of Fig. 1.

Fig. 3 is a cross-sectional view taken on the line 3—3 of Fig. 1.

Fig. 4 is a cross-sectional view taken on the line 4—4 of Fig. 1.

Fig. 5 is a view of a portion of the apparatus shown in Fig. 1, showing the method of assembly.

Fig. 6 is a diagrammatic view showing the wiring arrangement for the electric heaters shown in Fig. 1.

Figs. 7 and 8 are respective views of separated parts of the apparatus shown in Fig. 1, a portion of the apparatus being broken away in Fig. 8.

The apparatus shown in Fig. 1 of the drawing is a very compact device particularly adapted for the elimination of hydrogen in the air or atmosphere of a submarine and may be installed directly in the battery compartment or connected thereto so that the atmosphere of the compartment is circulated through the eliminator. Where the batteries are enclosed in a ventilated chamber, the apparatus shown in Fig. 1 may be connected directly to the chamber so that the air used for ventilating is passed through the hydrogen eliminating apparatus from which the purified air may be allowed to circulate to other parts of the submarine.

Referring to Fig. 1 of the drawing, the air to be purified is conducted by convection, or preferably by a fan or blower, into the apparatus for eliminating free hydrogen through a duct 10 which terminates in a conical-shaped header 12 for distributing the air to a preheating section of the apparatus. The header 12 is provided with an end plate 13 and is secured to the body of the eliminator by means of studs as shown in Fig. 5. The air in the header is conducted through three ports 14 into an annular distributor passage 16 between concentric shells 18 and 20. The cylindrical shell 18 encloses the reaction zone and is provided with longitudinal external fins 22 so that the air passing between the shells 18 and 20 is preheated by heat conducted from the reaction zone. The shell 20 is also provided with similar external fins 24 for taking heat from purified air, and is surrounded by an outer concentric shell or casing 26 which fits over the fins 24. The concentric shells and associated fins may be made up in various ways to accomplish the desired purpose.

The air to be purified is preheated between the shells 18 and 20, and passed into an end compartment 28 in the shell 20 formed by an end plate 29, and then is reversed in flow into the end of the shell 18 where the air is heated to a temperature of approximately 350° to 450° F. by means of an electric heating unit inserted in the end of the shell 18, and comprising a distributor screen 30, an electric resistance heating grid 32, a second distributor screen 34, a second electric resistance heating grid 36 having wires arranged at approximately right angles to the direction of the resistance wires of the grid 32, and finally a mixing or distributor screen 38. A diagrammatic arrangement of this heater is shown in Fig. 6. The air passing through the heater arrangement in the end of the shell 18 is heated to a temperature sufficient for decomposing substances such as stibine which would poison the catalytic material used in the reaction zone.

Substantially all of the remainder of the shell 18 is filled with a catalyst bed, preferably unglazed porcelain pebbles 40 having a surface coating of platinum black as a catalyst. The pebbles may be conveniently of about one quarter inch in size and are held in the shell 18 between screens 41 and 42 fastened in the shell 18. The reaction zone also includes an electric resistance heating element 44 which may be merely a loop extending among the pebbles 40 and which serves to initiate and maintain a suitable reaction temperature of from 600° to 700° F. in the reaction zone. The air entering the reaction zone in the shell 18 passes to the left in intimate contact with the catalyst on the pebbles 40 and any free hydrogen present in the air is oxidized to form water. The purified air discharged from the reaction zone passes through the screen 42 into an end compartment 46 formed by the end plate 13 of the header 12 and the shell 18, and is then conducted through three ports 48 into an annular distributor passage 50 between the shells 20 and 26. A gasket is provided, as shown, between the header and the body of the apparatus. The relatively hot air then passes between the shells 20 and 26 in contact with the fins 24 which pick up heat and conduct it to the incoming air passing between the shells 18 and 20. The right end of the outer shell 26 is open so that the purified air is discharged directly into the compartment or chamber in which the apparatus is mounted, but if desired the purified air may be conducted to any other compartment in the submarine and be cooled to remove moisture formed by the reaction in the shell 18.

The electric resistance heating elements 32 and 36 are arranged in series and supplied with current by lead wires 52 and 54 while the resistance heating element 44 is independently supplied with current through the lead wires 52 and 56, so that the separate heating zones may be independently controlled. The resistance elements 32 and 36 will usually be continuously supplied with current in order to decompose substances such as stibine which would otherwise poison the catalyst, while the resistance 44 may be cut out after the operation is established. The combustion of the free hydrogen by the catalytic operation produces considerable heat, and unless the free hydrogen content of the air is very low, the reaction will produce sufficient heat to maintain the reaction temperature in the catalyst bed. The lead wires 52, 54 and 56 extend through the end plate 29 for the end of the shell 20. If this plate is of insulating material it will be unnecessary to provide insulation in the plate for the lead wires as shown.

Figs. 7 and 8 show the apparatus with the header 12 removed and certain parts cut away to show the path of flow of air. The apparatus may be of any desired size sufficient to handle the necessary volume of air and may be constructed in any form necessary to be conveniently placed in the space available in the submarine. The apparatus as illustrated is very compact and efficient, and the provision for decomposing catalyst poisons insures an effective and reliable operation over long periods of time. It appears that the oxygen in the air actually increases or tends to maintain the activity of the platinum black catalyst and that the oxygen absorbed or adsorbed on the surface of the catalyst, or embedded in the porous lattice of the catalyst, is increased in activity so that it readily reacts with the hydrogen contained in the air.

The purified air produced by the process of the present invention is preferably discharged from the apparatus at a temperature above 212° F. so that there will be no moisture condensed in the apparatus. On the other hand, the air temperature in the apparatus prior to entering the catalyst bed or after leaving the apparatus, should not be high enough to cause ignition of the hydrogen which would result in an explosion. The air inlet and outlet of the apparatus may be provided with gauze flame-arresters.

While platinum black is preferred as the catalyst for the elimination of free hydrogen, other oxidation catalysts adapted to cause the combustion of hydrogen at relatively low temperatures may be used, such as Pd, Hg, Se, Cu, and Ce. The catalyst may be deposited on any suitable carrier.

The apparatus in the form described, is particularly adapted for the elimination of free hydrogen in submarines to prevent the hydrogen content of the air therein from approaching the lower explosion limits, but the method and apparatus may be used for other purposes such for example as in mines and in electric battery-driven torpedoes in order to avoid premature explosions which are liable to be set off, by electric sparks from relays used in the torpedo, when the hydrogen evolved by the batteries reaches explosive proportions in the air in the torpedo.

Having described the invention in its preferred form, what is claimed as new is:

1. The method of removing free hydrogen from the air of an electric battery compartment, which comprises passing the air in a stream through a heating zone and therein heating the air to a temperature of about 350° to 450° F. to decompose its contained stibine, removing antimony freed by such decomposition from the air stream, thereafter passing the heated air through a catalyst bed at a temperature of from 600° to 700° F., and in contact with a platinum black oxidation catalyst adapted to oxidize the free hydrogen content of the air.

2. The method of purifying an atmosphere containing free hydrogen as well as traces of catalyst poisonous stibine produced as the result of the charging and discharging of electric batteries, which method comprises passing the air in a stream through a heating zone and heating it to a temperature of about 350° to 450° F. to decompose stibine, removing antimony freed by such decomposition from the air stream, and thereafter passing the heated stream of air through a reaction zone in intimate contact with an oxidation catalyst adapted to oxidize the free hydrogen of the air, said reaction zone being operated at a temperature substantially below the ignition temperature of the free hydrogen in the air stream.

3. The method of purifying air as defined by claim 2 in which the oxidation catalyst is platinum black.

4. The method of catalytically removing free hydrogen from air containing both hydrogen and stibine resulting from the charging and discharging of electric storage batteries, which method comprises passing such air in a stream through a heating zone and therein heating it to a temperature of about 350–450° F. to decompose such stibine, diffusing such air through a screen, then passing the stream of heated air through a reaction zone in intimate contact with a platinum black oxidation catalyst, and maintaining said air in said reaction zone at a temperature of the order of 600–700° F. to effect substantially complete oxidation of the free hydrogen.

5. The method of catalytically removing free hydrogen from air containing small proportions of free hydrogen and stibine as a result of the charging and discharging of storage batteries, which method comprises the steps of passing such air in a stream through a heating zone and therein heating the air to a temperature of from 350–450° F. to decompose completely its contained stibine, diffusing such air through a screen both during and after such heating, then passing said heated air through a reaction zone in intimate contact with an oxidation catalyst which is adapted to oxidize the free hydrogen in said air stream at temperatures well below the ignition point of hydrogen, passing said entering air in heat exchange relation with air in the reaction zone to cool the latter, and passing hydrogen-free air from said reaction zone in heat exchange relation with the entering air to cool the former to a temperature of not less than 212° F.

JOHN D. MORGAN.
PERCY B. LEVITT.